United States Patent [19]
Manor et al.

[11] 3,780,439
[45] Dec. 25, 1973

[54] SIMULATED DENTITION

[76] Inventors: Richard C. Manor, Rt. 2, Box 182, Big Rapids, Mich. 49307; Henry W. Osowski, P.O. Box 222, Chippawa Lake, Mich. 49320

[22] Filed: July 15, 1971

[21] Appl. No.: 162,827

[52] U.S. Cl. ............................................... 32/71
[51] Int. Cl. ........................................ A61c 19/00
[58] Field of Search ............................. 32/71, 2, 1

[56] References Cited
UNITED STATES PATENTS
703,720    1/1902    Dunn ..................................... 32/5
3,520,060  7/1970    Crabtree et al. ....................... 32/71

Primary Examiner—Robert Peshock

[57] ABSTRACT

A simulated dentition for use by a dental student when studying and experimentally learning painstaking skills, dental practice, and chairside procedures comprising: an innovation expressly fabricated for placement and temporary retention within the confines of the oral cavity of a live in-the-chair student impersonating an actual patient. Made of non-deleterious material and structured to provide precisely contoured and compatible components upon which dental operative procedures can be capably evaluated and safely executed by the dental student. The first named student becomes a "dentist" and a second in-the-chair student provides the "patient." The essence of the concept pertains to the unique intra-oral dentition.

1 Claim, 3 Drawing Figures

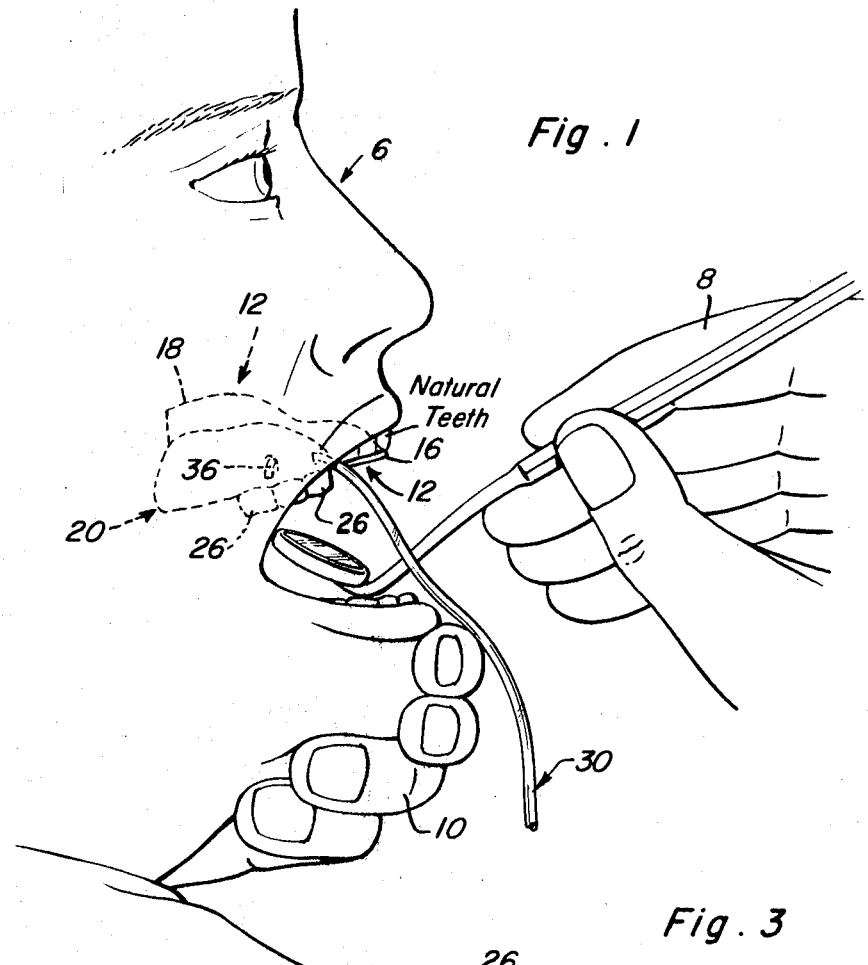
Fig. 1
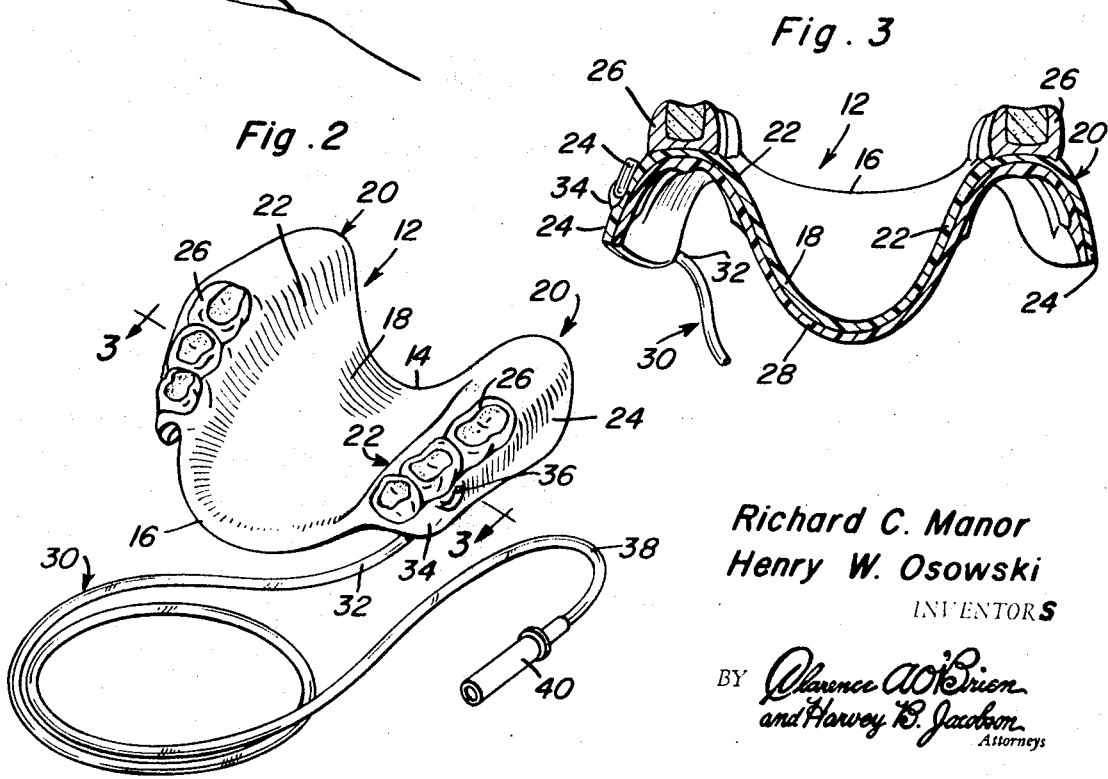
Fig. 2
Fig. 3
Richard C. Manor
Henry W. Osowski
INVENTORS
BY Clarence A. O'Brien
and Harvey B. Jacobson
Attorneys

SIMULATED DENTITION

This invention relates to that field of endeavor which has to do with demonstrating and teaching the art, techniques and recognizably approved procedures of dentistry and, more particularly, to a simulated dentition or denture which lends itself for use by dental students and aides under the supervisory and critical eye of an instructor skilled in the art of dentistry.

More specifically, the device, a specially designed dentition, is intended for feasibly applicable use in connection with active practice and instructional demonstration of recognized dental operative procedures. Painstaking handling and use facilitate the acquirement of skills needed for correct operative procedures. If the device is to be used for instructional demonstration, practice or learned accomplishments involving dental students or student surgeons, the self-contained artificial teeth can be solidly whole, that is, without experimental cavities. In the case of dental auxiliary students and others, the simulated teeth can be charged with appropriate cavity fillings or preparations.

In carrying out the principles of the inventive concept, novelty is predicated in part on an adaptable practice dentition or denture which is non-deleterious and can be efficaciously inserted into a living human oral cavity, as distinguished from the customary inanimate manakin, whereby to provide precision-made component parts upon which dental operative procedures can be safely executed by the dental student.

Another aspect of the invention which is regarded as significant is that wherein the device is fittingly lodged in a human oral cavity it presents itself and its self-contained features in such a manner that the student "dentist" may perform all such dental operative procedures which, as a matter of fact, could be done on a human dentition within the environment of the oral cavity of a regular patient. Then too the device is so designed that the totality of the component parts are compatible with the human tissues which are contacted during practice use.

For background purposes the reader, if so desired, may acquaint himself with the rather non-analogous dental form shown in a patent to Raymond J. Wenker 1,045,920 and to a somewhat more analogous patent which has to do with an educational model, that is, a patent issued to William Arrow 2,657,462. As having a more noticeable bearing on the subject matter of the invention attention may be accorded the patent to Charles F. Bryant 739,980. In connection with Bryant it will be observed that the patentee does not contemplate the simulated dentition for use such that the upper, maxillary teeth point downward within a human subject and therefore does not present the skill development of using, as in the instant invention, a mirror and working with reverse images. Then too Bryant does not contemplate the utilization of the simulated dentition integrally with the human paradontia but has an object in an isolated position.

Briefly, the invention herein under advisement has to do with a self-contained simulated dentition or denture which is such in construction that it guards against the likelihood of accidental injury to the vulnerable alveolar tissues while said device is confined and retentively lodged within the environment of an oral cavity of a live human being and during which time prescribed operative dental procedures are being executed with instruments, for example, by a student dentist. The simulated dentition is of a protective type made of molded plastic material and shaped and contoured to orient and coordinate itself with and to simulate intra-oral cavity anatomy, and whose component parts are compatible with tissues which are conformably mated therewith. The dentition is rigidly structured to permit dental operative techniques and procedures to be performed directly thereon, that is while it is within the confines of the oral cavity and comparable, as it were, to corresponding dental procedures usually performed within a prepared cavity of an inanimate manakin.

It will be apparent, as hereinafter evident that a significant purpose of the invention is to enable the dental student to carry out the dental operative procedures within the confines of a human oral cavity as opposed to pursuing similar procedures in connection with inanimate manakins. To the ends desired, the student dentist is confronted by a human being and is called upon to experience the human attributes of psychic resistance. Furthermore, the use of this invention promotes a feeling on the part of the student dentist which engenders compassion for a human subject.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view illustrating, partially of course, the head of the student who is called upon to impersonate a "patient" and which is employed to give the viewer an idea of how the simulated dentition is fitted in the upper part of the oral cavity where it is accessible for examination, demonstration, use of mirror reflections and in carrying out the aforementioned dental operative procedures.

FIG. 2 is a view in perspective of the simulated dentition and also showing a capillary tube (only one used) with an attached end secured for such demonstrative purposes as are desired.

FIG. 3 is a view on a slightly enlarged scale taken approximately on the plane of the section line 3—3 of FIG. 2, looking in the direction of the indicating arrows.

In connection with FIG. 1 it is believed that it will serve and suffice to reveal the objects, features and advantages of the intra-oral cavity simulated dentition. In this connection, it is believed to be unnecessary that the many and varied dental operational procedures need be illustrated. In fact, it will suffice merely to show, as has been shown, the dentition in the roof of the mouth of the oral cavity lodged in place and illustrating, how for example, a dental mirror is used, during which time the student "dentist" learns to work with a mirror and observes the reflection of the upper jaw structure in reverse image. This view also illustrates, it is believed, the safety and shielding characteristics of the device insofar as it relates to both students.

The numeral 6 in FIG. 1 designates a living subject which, for purposes of this invention, is a live in-the-chair student and functioning to cooperate with the dental student whose hands are shown, that is the right hand at 8 holding a mirror and the left hand at 10 poised upon the chin of the student "patient" 6.

The simulated dentition (or denture) illustrated with particularity in FIGS. 2 and 3 is so designed that when in use it functions to protect the human tissue from injury during the time dental operative procedures are being executed upon surface portions thereof, that is, within the human oral cavity illustrating in FIG. 1. Then too it is such in structural capability that it simulates a human dentition and is such in tensile strength and capabilities as to permit the dental operative procedures to be executed upon it while it is lodged and physically retained within the human oral cavity. In fact, it resembles (FIG. 2) an ordinary insertable and removable upper denture. This dentition is denoted, construed as an entity, by the numeral 12 and is characterized by a concave-convex imperforate body portion which constitutes a rigid palate and which, as shown in FIG. 2, embodies an inward or rearward edge portion 14 which can be straight across and an arcuately delineated forward edge portion 16 which when in use matches and is substantially flush with the natural teeth of the wearer as brought out in FIG. 1. The primary component parts of this dentition are made of molded acrylic plastic material. The concave area is denoted at 18 and is in proper relationship to the spaced parallel coplanar open ended channel-like concave-convex side portions. These side portions are denoted, generally stated, at 20 and are basically alike, the channel formations being such that when in use they cap over and enclose the coordinating natural teeth in a manner illustrated in phantom lines in FIG. 1. The junctional lingual portions or surfaces are denoted at 22 and merge with the convex surfaces of the side portions whose outer or exterior surfaces are designated as buccal surfaces 24. The fixedly mounted implanted teeth (left and right molar teeth) are denoted at 26. It is reiterated that if the device is to be used by dental students, those learning to become dental surgeons, the teeth would be without cavities. If the device is to be used by students learning to become dental aides, the teeth would be with cavities or, alternatively, filled in the manner suggested in FIGS. 2 and 3. In addition to the hard conformably shaped component parts of the denture it will be noted particularly in FIG. 3 that both the concave-convex body portion and the concave-convex side portions are made of shape-sustaining plastic material formed to simulate human intra-oral anatomy, the teeth being implanted thereon. The attachable surface of the main component parts is completely covered with a ply or lamination of impression material 28 which serves as a buffer between human tissues and the rigid component parts of the overall dentition.

A capillary tube is provided as at 30. In actual practice two such tubes can be used, that is, on each marginal side of the dentition. For simplicity an end portion 32 is anchored as at 34 with the end exposed at 36. The other free end portion 38 is provided with a fitting 40 of suitable construction which can be connected with a water source (not shown) or can be supplied with a hand-squeezed bulb (not shown).

It will be evident from the views of the drawing that the invention provides inherent safety features by shielding and protecting the contacted tissues and teeth.

It will be evident from the views of the drawing and the description that the invention enables one to become familiar with many of the procedures of operative and prosthetic dentistry within the human oral cavity. Virtually all normal operative procedures can be executed within the human oral cavity. The device can be inspected for critical examination within or exteriorly of the cavity.

With this invention it is feasible and practical for an instructor to readily observe actual progress in the various procedures and the operative procedural steps resorted to by the student "dentist" can be achieved without harm to the human "manakin" 6. The device in use permits one to cut various cavities, to fill cavities with a variety of permanent or temporary restorative materials and achieves person-to-person human interrelationship not before posssible when working on dentitions and dentures outside of the oral cavity. Further, this device is so constructed that it allows an individual to place matrix bands (not shown) on a tooth (teeth) in the same manner as would be carried out by a dentist in normal procedural dentistry.

It would be within the purview of the inventive concept to provide facilities (not shown) to provide the presence of oral secretions, saliva, blood and other attending aspects of intro-oral dentistry.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A simulated dentition for use in studying and learning dental operative practices insertable into a normal oral cavity of a living human having natural teeth comprising a body portion having generally channel shaped side portions, said side portions being offset from the body portion a distance sufficient to receive and overlie the gums and natural teeth, said body portion overlying and protecting the area of the oral cavity between the gums and said side portions overlying and protecting the natural teeth and gums when disposed in the human oral cavity, said side portions having teeth fixedly disposed on the external surface thereof, said body portion and side portions having a liner of impression material with indentations for receiving the natural teeth to secure the simulated dentition to the natural teeth in the oral cavity, said body portion, side portions and teeth being constructed of material resistant to penetration by intra-oral dental implements, tool and the like, thereby enabling intra-oral activities to be performed on the simulated dentition while disposed in a normal oral cavity of a living human without injury to the area of the oral cavity covered thereby with all other areas of the oral cavity being natural thereby enabling the intra-oral activity to be repeatedly conducted under substantially normal conditions.

* * * * *